United States Patent

[11] 3,586,856

| [72] | Inventors | Walter L. Brown<br>Berkeley Heights;<br>Thomas C. Madden, Chester; James L.<br>Merz, New Vernon; Gabriel L. Miller,<br>Westfield; David G. Thomas, Summit, all<br>of, N.J. |
|---|---|---|
| [21] | Appl. No. | 713,539 |
| [22] | Filed | Mar. 15, 1968 |
| [45] | Patented | June 22, 1971 |
| [73] | Assignee | Bell Telephone Laboratories, Incorporated<br>Murray Hill, Berkeley Heights, N.J. |

[54] RADIATION DETECTOR USING ISOELECTRONIC TRAP MATERIAL
4 Claims, 2 Drawing Figs.

[52] U.S. Cl. .................................................. 250/71.5,
250/71, 250/211
[51] Int. Cl. ................................................. G01t 1/20
[50] Field of Search ........................................... 250/71,
71.5, 211 J

[56] References Cited
UNITED STATES PATENTS

| 2,821,633 | 1/1958 | Friedman .................... | 250/71.5 |
| 2,897,368 | 7/1959 | Lundberg et al. ............. | 250/71.5 |
| 3,116,417 | 12/1963 | Orr et al. .................... | 250/71.5 |
| 3,342,745 | 9/1967 | Hofstadter .................... | 250/71 |
| 3,415,989 | 12/1968 | Leventhal et al. ............ | 250/71.5 |

*Primary Examiner*—Archie R. Borchelt
*Attorneys*—R. J. Guenther and Arthur J. Torsiglieri ABSTRACT: A radiation detection arrangement comprises a member of material characterized by isoelectronic traps which emit light upon bombardment by radiation to be detected. A suitable photoresponsive device converts the light thus emitted into electrical signals.

(TABLE I)

|  | NAI(TL) | ZNS(AG) | PLASTIC | CDS:TE |
|---|---|---|---|---|
| RELATIVE EFFICIENCY (e) | ~0.3 | ~0.5 | ~0.05 | ~0.3 |
| DECAY TIME | 250 ns | 10 μs | 5 ns | 100 ns |
| SPECTRUM | B-G | G | B | R |
| TRANSPARENCY | ✓ | ✗ | ✓ | ✓ |
| DENSITY | 3.6 | 4 | 1.2 | 4.8 |
| Z (OF HIGHEST Z COMPONENT) | 53 | 30 | 6 | 48 |
| SUITABILITY FOR USE IN LARGE VOLUME | ✓ | ✗ | ✓ | ✓ |

INVENTORS:
W. L. BROWN
T. C. MADDEN
J. L. MERZ
G. L. MILLER
D. G. THOMAS

BY: *David P. Weller*
ATTORNEY

RADIATION DETECTOR USING ISOELECTRONIC TRAP MATERIAL

BACKGROUND OF THE INVENTION

This invention relates to radiation detection and, more particularly, to scintillation counters.

In scintillation counters, the radiation of interest strikes a suitable phosphor, producing light. The emitted light is detected by a photomultiplier which in turn produces an electrical pulse whose amplitude is proportional to the energy of the incident radiation, and the time of occurrence is related to the moment of impingement of the radiation on the phosphor. Such a method of detecting radiation is, in some respects, superior to the semiconductor diode detector, especially in the detection of high energy gamma ($\gamma$) rays. For example, in a scintillation counter the light is created at active sites throughout the crystal, whereas in a charge collecting detector the holes and electrons liberated by the incident radiation must travel all the way to the contact to be collected.

To be suitable for use as a phosphor, a material should preferably have a high efficiency in converting incident particle energy into optical energy; it should be transparent to its own radiation, and should have a short optical decay time. This last is important as a measure of the ability of the material to differentiate clearly between successive pulses of radiation.

In addition to the foregoing, it is also desirable that the material have certain other characteristics, although they are not necessary to the proper operation of the counter. Among these characteristics are a light output having its spectrum in the visible, which permits a good match between detector and photomultiplier spectral response. A second desirable characteristic is a high value of Z (atomic number), or charge on the nucleus. The higher the Z, the greater is the ability of the material to interact with incident ($\gamma$ rays). In addition, a high density is desirable so that charged particles have a short range in the phosphor, thereby minimizing light collection problems. Another desirable characteristic is that the material be available in the form of large crystals.

At the present time, there are two preferred types of phosphors for use as scintillation counters: thallium activated sodium iodide, NaI(Tl), for the detection of gamma rays, and plastic scintillators for charged particles. The plastic scintillators have the advantages of being quite fast and highly transparent, however, they are relatively inefficient as compared to NaI(Tl)

SUMMARY OF THE INVENTION

The present invention is based upon the discovery that the so-called isoelectronic trap materials exhibit most of the above enumerated desiderata, and can perform extremely well as scintillation counters. These materials, such as tellurium doped cadmium sulfide (CdS:Te), which is disclosed and claimed in United States patent application Ser. No. 627,883 of J. D. Cuthbert and D. G. Thomas, filed Apr. 3, 1967, now Pat. No. 3,462,630 issued on Aug. 19, 1969, and oxygen doped zinc telluride (ZnTe:O), disclosed and claimed in U.S. Pat. application Ser. No. 563,169 of J.D. Cuthbert, J. J. Hopfield, and D. G. Thomas, filed July 6, 1966, now Pat. No. 3,413,506, issued on Nov. 26, 1968, are characterized by the impurity material being of the same chemical grouping as one of the constituent elements of the crystal. The impurity atoms substitute isoelectronically for the atoms of that constituent element, forming what is called isoelectronic traps. These traps attract either holes or electrons, which in turn attract carriers of the opposite polarity, forming bound excitons. Light is emitted when the hole and the electron recombine. Under bombardment by incident radiation, holes and electrons are produced and their recombination produces light at the site of the isoelectronic trap.

In an illustrative embodiment of the invention, a crystal of an isoelectronic trap material is mounted on the face of a suitable photomultiplier tube. Bombardment of the crystal by incident radiation produces light within the crystal. Because of the transparency of the crystal to its own radiation, the light is easily detected by the photomultiplier tube, which converts it into electrical pulses.

It is a feature of the present invention that a crystal of an isoelectronic trap material functions as the phosphor of a scintillation counter.

DETAILED DESCRIPTION

Figures 1, 2:
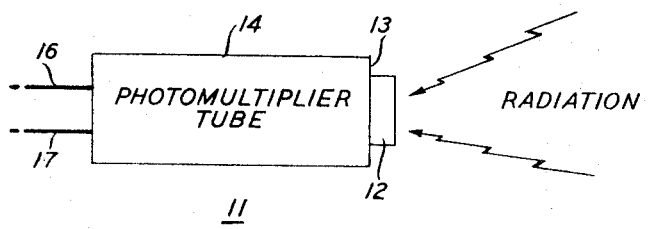
FIG. 1 is a diagrammatic view of a scintillation counter embodying the principles of the present invention.
FIG. 2 consisting of TABLE I is a chart comparing the characteristics of certain scintillation counting materials.

In FIG. 1 there is shown a scintillation counter 11 embodying the principles of the present invention. Counter 11 comprises a member 12 of isoelectronic trap material which may be, for example, a crystal of CdS:Te, mounted on the face plate 13 of a photomultiplier tube 14. Tube 14 may take any one of a number of forms well known in the art and commercially available. It should be capable of producing an electrical signal via output leads 16 and 17 in response to light incident upon face 13. For the present application it is desirable that tube 14 have a spectral response that includes the light spectrum of member 12, which varies with different materials.

In operation, radiation incident upon member 12 produces luminescence within the member at the isoelectronic traps. This light passes through member 12, through face 13 of tube 14, to the cathode (not shown) of tube 14, which emits electrons in accordance with the intensity and duration of the incident light. These electrons in turn produce an electrical signal indicative of the amount, intensity, and duration of the radiation incident on member 12.

As mentioned heretofore, there are several either necessary or desirable properties that the radiation sensor of a scintillation counter should possess. In TABLE I some of these important properties are listed for a number of phosphors or sensors, including CdS:Te, an isoelectronic trap material. It can be seen in TABLE I that ZnS(Ag) is not transparent to its own radiation and is not suitable for use in large volume. The shortcomings limit its use to finely divided powder coatings which are of no use for detecting incident particles of long range. In addition, this material has a relatively slow decay time. Inasmuch as the decay time is a measure of the capability of the material to distinguish between successive incident particles of radiation, ZnS(Ag) is not as discriminating as the other materials. For these reasons, this material has only very specialized uses, and is much poorer than the other materials as a scintillation counter.

The material NaI(Tl) in certain respects compares favorably to CdS:Te as a scintillation counter material. Its relative efficiency to electron detection, for example, is roughly the same, and it has a slightly higher value of Z than CdS:Te. However, it has a much slower decay time than CdS:Te and slightly less density. Although the two materials are roughly comparable, NaI(Tl) is not as useful as CdS:Te in scintillation counting since it is strongly hygroscopic and hence must be encapsulated, which renders it unsuitable for heavy particle spectroscopy. On this bases CdS:Te is the preferable material.

The plastic material is superior to CdS:Te in only one category, namely, decay time. Its efficiency, density, and Z value are all inferior to the isoelectronic trap material.

From the foregoing, it can be seen that the isoelectronic trap material, as exemplified by CdS:Te, is superior to other commonly used materials for scintillation counting. While CdS:Te is the example of isoelectronic trap material used, numerous others perform equally as well or better, at least in some categories. Examples of these materials include the aforementioned ZnTe:O, various III–V compounds doped with nitrogen, and various III-V compounds doped with bismuth. Such materials form isoelectronic traps which produce light at the sites of the traps. To be useful as scintillation counters, they should be transparent to their own radiation.

It should be pointed out that such materials may also be used in the detection of thermal neutrons where they possess a sufficiently high capture cross section for the neutrons. An example of one such material is CdS:Te.

What we claim is:

1. A radiation detector comprising a member of material having a crystal structure containing isoelectronic traps therein and characterized by the emission of light from the isoelectronic trap sites when radiation is incident upon said member, said member being substantially transparent to the light and means for converting the light emitted by said member into electrical signals.

2. A scintillation counter comprising a crystal member of isoelectronic trap material which is capable of emitting optical radiation upon bombardment by incident radiation, said crystal member being substantially transparent to the light thus emitted, said member being mounted upon the face plate of a photomultiplier tube having a spectral response that includes the spectrum of the radiation emitted by said crystal member.

3. A radiation detector comprising a member of cadmium sulphide having a crystal structure containing isoelectronic trap sites therein formed by tellurium atoms, and characterized by the emission of light from the isoelectronic trap sites when the radiation is incident upon said member, said member being substantially transparent to the light, and means for converting the light emitted by said member in response to said radiation into electrical signals.

4. A radiation detector comprising a member of zinc telluride having a crystal structure containing isoelectronic trap sites therein formed by oxygen atoms, and characterized by the emission of light from the isoelectronic trap sites when the radiation is incident upon said member, said member being substantially transparent to the light, and means for converting the light emitted by said member in response to said radiation into electrical signals.